United States Patent [19]

Poll

[11] Patent Number: 5,159,887

[45] Date of Patent: Nov. 3, 1992

[54] PLANT TRANSPLANTER

[76] Inventor: Howard B. Poll, 707 Aster Ave., Holland, Mich. 49423

[21] Appl. No.: 613,227

[22] Filed: Nov. 13, 1990

[51] Int. Cl.$^5$ ............................................. A01C 11/02
[52] U.S. Cl. ..................................... 111/109; 111/194; 111/100; 172/747; 172/519
[58] Field of Search ............... 111/109, 104, 111, 117; 172/747, 519, 538

[56] References Cited

U.S. PATENT DOCUMENTS

| | | | |
|---|---|---|---|
| 516,745 | 3/1894 | Pitt | 111/111 |
| 1,657,944 | 10/1926 | Stocker et al. | |
| 1,963,036 | 6/1934 | Trolley | 111/177 |
| 2,249,637 | 7/1941 | Rietz | 172/519 |
| 2,739,548 | 3/1956 | Poll | 111/111 |
| 2,749,855 | 6/1956 | Guigas | 111/111 |
| 2,831,442 | 4/1958 | Montguire | 111/111 |
| 2,950,770 | 2/1958 | Wilson | |
| 2,960,944 | 11/1960 | Poll | 111/111 |
| 3,094,082 | 6/1963 | Wilson | 111/111 |
| 3,246,615 | 4/1966 | Poll | 111/111 |
| 3,514,830 | 6/1970 | Takakita et al. | 172/747 |
| 3,872,805 | 3/1975 | Kolk et al. | |
| 4,090,456 | 5/1978 | Morrison et al. | 111/111 |
| 4,106,415 | 8/1978 | Hakli | |
| 4,112,857 | 9/1978 | Bradley | |
| 4,290,373 | 9/1981 | Boots et al. | |
| 4,408,550 | 10/1983 | Ellis | 111/111 |
| 4,440,101 | 4/1984 | Edwards et al. | 111/111 |
| 4,742,785 | 5/1988 | Kolk et al. | 111/111 |
| 4,889,472 | 2/1990 | Winter | 37/270 |

FOREIGN PATENT DOCUMENTS

| | | | |
|---|---|---|---|
| 1038236 | 9/1978 | Canada | |
| 2307455 | 11/1976 | France | |
| 2575030 | 6/1986 | France | 111/104 |
| 323547 | 5/1970 | Sweden | |
| 408618 | 7/1974 | U.S.S.R. | |
| 1090281 | 5/1985 | U.S.S.R. | 111/109 |

OTHER PUBLICATIONS

KMC Unit Planter Brochure, Oct. 1988, Tifton, Ga., Kelley Manufacturing Co.
White Farm Equip., 5100 Seed Boss Brochure, Oak Brook, Ill.
Allis-Chalmers Brochure, Jan. 1979, "Row Crop Planters".
Yetter Row Crop Planter Units, Oct. 1988.
Mechanical Transplanter Company-Model 4000.
Holland Transplanter-Planter w/ front wheel direct drive.
Lannen Tehtaat Oy-RT-2.
Mechanical Transplanter-Model 6000.
Lannen, The Accelerated Transplant System.
Holland Transplanter Catalog.
Moorehouse Gyro Rotary Transplanter.
"Holland's Non-Stick Shoe", Holland Transplanter Inc., Holland Mich. 49423.

Primary Examiner—Dennis L. Taylor
Assistant Examiner—Spencer Warnick
Attorney, Agent, or Firm—Price, Heneveld, Cooper, DeWitt & Litton

[57] ABSTRACT

A transplanter is disclosed which provides uniform planting without damaging plants. The transplanter includes a rotating cup assembly having two-piece clam shell cups, one of which opens by lateral movement by the cup halves of the cup. The transplanter also includes a chute and kick plate which move together to position the plants received from the rotating cup assembly in the planting position. A unique means is provided for opening the cup halves at a position immediately above the chute to minimize any hang-up of the plants. A polymer furrow opening shoe is also disclosed which includes a protective member which prevents soil damage to the polymeric surface. Also novel packing wheels are disclosed.

23 Claims, 4 Drawing Sheets

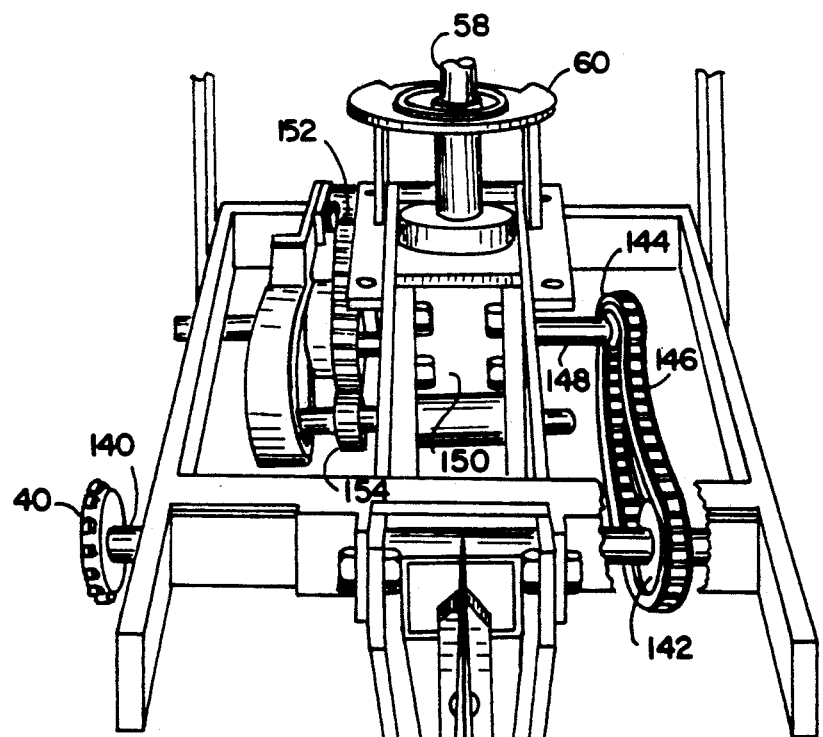
FIG. 9
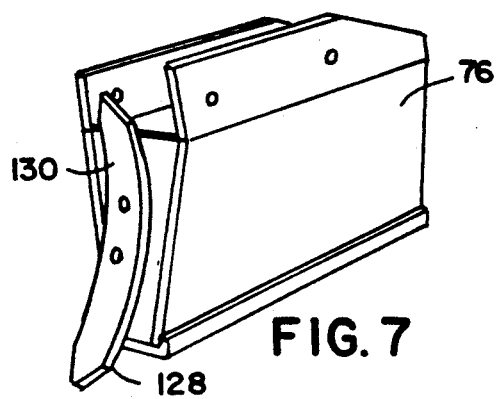
FIG. 7
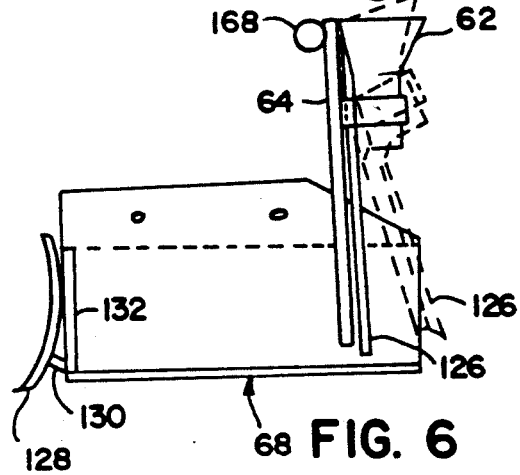
FIG. 6

PLANT TRANSPLANTER

BACKGROUND OF THE INVENTION

The present invention pertains to a plant transplanter and more particularly to a mechanical plant transplanter which is especially adapted for use with small and large leafed plants.

When transplanting plants, it is important that they be planted without damaging the leaves, stems or roots. Additionally, it is important to have the plants placed at a uniform depth and spacing so that the maximum number of plants may be planted in a field and still thrive. It is also important that the planter mechanism itself not jam or otherwise interfere with the transplanting process.

Mechanical transplanters are known which enable a large number of plants to be planted in a field in a relatively short time frame, and at regular intervals. With known transplanters, however, it is difficult to transplant large leafed plants without damaging them. One prior art transplanter is disclosed in U.S. Pat. No. 4,290,373, entitled SEEDLING TRANSPLANTER. This transplanter includes a rotating tray with a pair of doors at the bottom of each cup for discharging plants from said cup into square transporter, and including a kicker at the bottom of the transporter. This transplanter is not reliable as plants becomes jammed at the location where the kicker meets the bottom of the square shoot for discharging plants from a furrow opening shoe. Additionally, the cup and doors arrangement disclosed in this patent does not adequately position plants over the transporter to prevent damage to large plants. Other known transplanters also damage plants as they pass through the planting mechanism, which is especially a problem for large leafed plants. Consequently, workers must manually replace damaged plants which have been planted by the mechanical transplanter.

Transplanters typically include a shoe which cuts a furrow in which plants are placed by the planting mechanism. Known shoes accumulate dirt thereon which widen the furrow, rendering planting unreliable. One prior art solution which avoids dirt accumulation on the shoe has a polymeric surface to which dirt does not stick. However, known furrow opening shoes having a polymer surface material wear prematurely and thus are relatively expensive to maintain.

SUMMARY OF THE INVENTION

The present invention is embodied in a mechanical transplanter having a reliable planting mechanism for large and small plants alike. Devices embodying the invention include a clam shell cup which holds the plants as they rotate from a loading position to a release position over a chute/kick plate. An embodiment of the invention includes a kick plate which carries the chute thereon so that they move together to discharge the plants. Another embodiment of the invention includes a polymer furrow opening shoe having an extending metal bottom which is substantially flush or extends beyond the outer polymer surface.

By providing a two-piece clam shell cup, plants drop easily into the cup and are protected against damage during the planting process. Additionally, the clam shell halves allow the cup to "stop" over the plant ejector as a roller cam opens the clam shell. Accordingly, plants will not hang up on the ejector. Additionally, the one-piece ejector having a kick plate carrying the transporter prevents clogging of the clamping mechanism. These and other objects, advantages, and features of the invention will become apparent upon review of the following specification in combination with the drawings.

BRIEF DESCRIPTION OF THE DRAWINGS

FIG. 6 is a sectional side view of the furrow opening shoe, ejector, and a cup taken along plane VI—VI of FIG. 2;

FIG. 7 is a perspective of a polymer furrow opening shoe according to the invention;

FIG. 9 is a perspective of the transplanter with the cup assembly removed; and

FIG. 10 is a perspective of a drive mechanism for the kick plate according to the invention.

DETAILED DESCRIPTION OF THE PREFERRED EMBODIMENT

Figure 1:
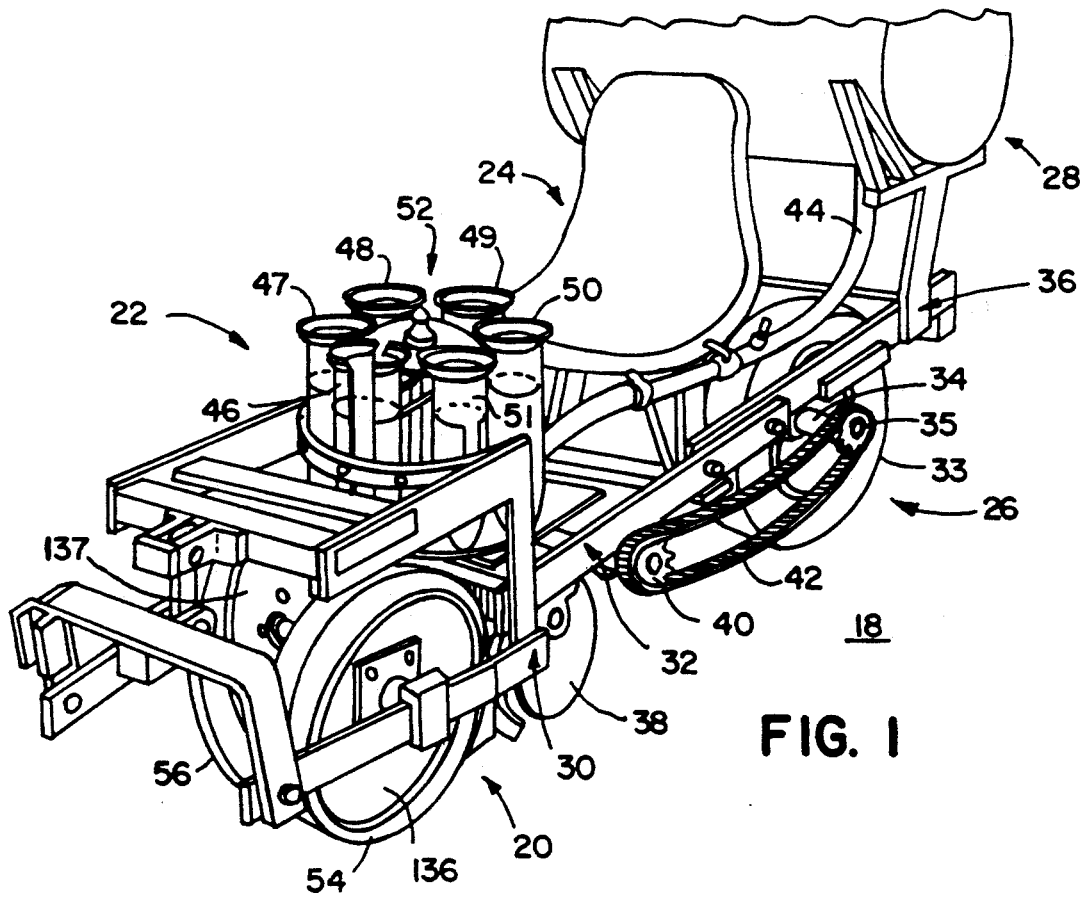
FIG. 1 is a perspective view of a plant transplanter according to the invention.

Referring now specifically to the drawings and the illustrated embodiments depicted therein, and particularly FIG. 1, plant transplanter 18 comprises packing wheel assembly 20 (and proceeding left to right), planting mechanism 22, operator station 24, front wheel drive assembly 26, and water tank 28. Packing wheel assembly 20 is carried by packing wheel frame 30. Operator station 24, as well as the transplanter mechanism 22, are carried by the central frame 32. Water tank 28 and front wheel drive assembly 26, having a wheel 33, an axle 34, and a sprocket 35, are carried by a front frame 36. The three frames 30, 32, and 36, are attached to one another to form the frame for transplanter 18. Central frame 32 further carries a disk 38 which breaks soil in front of planting mechanism 22, and a sprocket 40, which is coupled to sprocket 35 by chain 42 for rotation therewith. A transplanter operator sits at operator station 24 and places plants into cups 46–51 of cup assembly 52 as it rotates. Packing wheels 54 and 56 pack dirt around plants which are ejected from plant mechanism 22, as described in greater detail below. Water is supplied from water tank 28 to the transplanter mechanism 22 via hose 44.

Figure 2:
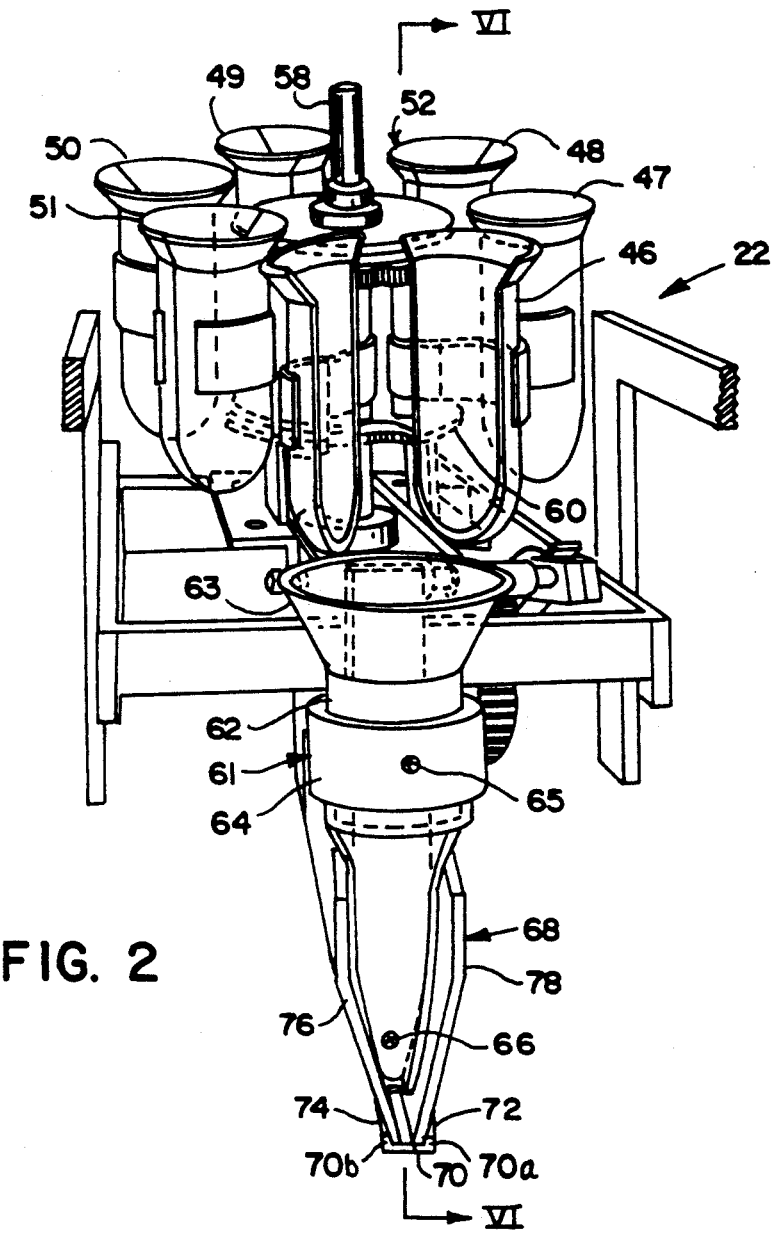
FIG. 2 is a perspective view of a cup assembly and ejector according to the invention.

Planting mechanism 22 is illustrated in greater detail in FIG. 2. The planter mechanism includes cup assembly 52 comprising the six cups 46–51 which rotate with shaft 58. Each cup is approximately 12 inches long so that six to eight inch plants may be received therein. Accordingly, the entire foliage of the plant is held within the cup, which protects the plant from damage during planting. As the cup assembly 52 rotates, five of the cups will be held closed by cam 60, as described below in further detail, and one cup is open over ejector 61. Ejector 61 includes a transporter cup or chute 62 which is carried by kick plate and ring 64, whereby plants are reliably discharged without getting hung-up as prior art planting mechanisms typically do. Chute 62 has an upper flared top 63 forming a funnel portion. At the lower end the chute 62 is cut away. Chute 62 is secured to kick plate and ring 64 by screw 65 and 66. The chute and kick plate are positioned within the shoe assembly 68 which includes an channel iron bottom piece 70, a pair of metal sidewalls 72 and 74, and polymer outer layers 76 and 78. Outer layers 76 and 78 prevent dirt from building up on the shoe as a furrow is dug, and thus maintains a narrow, uniform furrow width, which insures reliable planting by planting mechanism 22.

Figures 3, 4, 5:
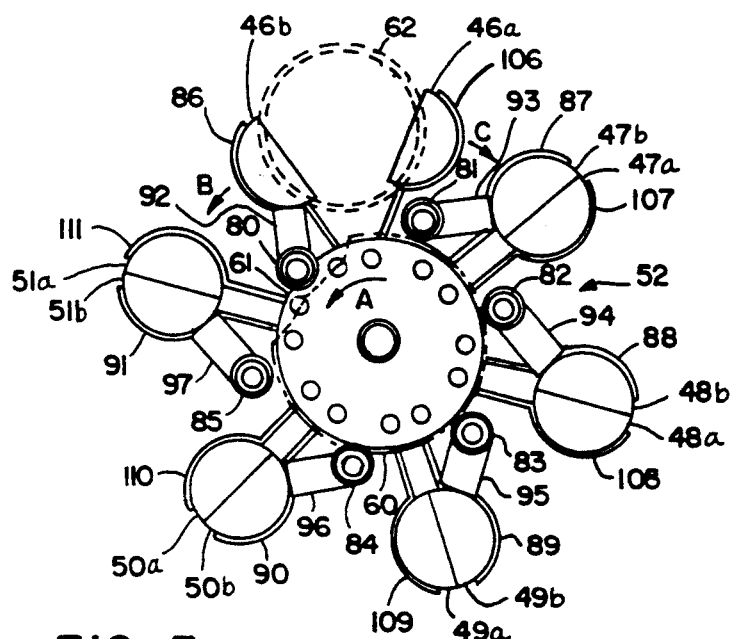
FIG. 3 is a bottom view of a cup assembly according to the invention.
FIG. 4 is perspective of a cup assembly according to the invention.
FIG. 5 is a side view of the cup assembly according to the invention with the cups removed.

Cup assembly 52 is shown in further detail in FIGS. 3, 4 and 5. Cups 46-51 each comprise two half shells 46a-51b which are held in a closed or open position by rollers 80-85, respectively. When rollers 80-85 are positioned against the full diameter of cam 60, the cups will be closed. When rollers 80-85 are positioned within detent 61 of cam 60, the respective cup will be open. Because the cut-a-way portion 61 is approximately one-sixth of the circumference of the cam, the cups will be open approximately one-sixth of the time. In order for the cup assembly 52 to rotate continuously, rollers 80-85 must make a smooth transition from detent 61 to the full diameter portion of cam 60. Accordingly, detent 61 should be formed such that it does not interfere with the rotation of rollers 80-85 around cam 60. Additionally, detent 61 should be positioned such that cups 46-52 open over chute 62.

Each roller 80-85 is affixed to one of the half shells 46b, 47b, 48b, 49b, 50b, and 51b by respective plates 86-91, which in turn carry respective brackets 92-97, having rollers 80-85 thereon. As illustrated in FIG. 4, the brackets 92-97 include two orthogonal sections, one section 98 being affixed by nuts and bolts 100 and 102 to plate 89, and the other section 104 carrying roller 83. As illustrated in FIG. 3, halves 46a, 47a, 48a, 49a, 50a, and 51a of the clam shell cups are carried by plates 106-111, respectively. Each of the plates 106-111 is connected to a spring 112 (FIG. 4) which biases the clam shell rollers 80-85, against cam 60. The relationship between the clam shell halves is illustrated in FIG. 5, wherein it can be seen that each of plates 88-90 have rollers 82, 83 and 84, respectively, carried thereon, and each of plates 108-110 are coupled to respective springs 116, 112 and 114 which bias the respective plates 108-112 toward the open position. Each of the plates 88, 89, 90, 108, 109 and 110 are coupled to respective gears 118-123 by respective axles 126-131, such that the respective cup halves 46a-51b move together, and at the same speed. Thus, when roller 83 moves into detent 61 of cam 60, spring 112 will pull the clam shell halves 49a and 49b apart by biasing roller 83 against detent 61, and plates 89 and 109 will move open together as gears 119 and 122 rotate together. The two gear constructions provide equal movement of the two halves of each cup, and thus provide a large opening between the cup halves, providing more room for the plants to drop into the transporter, cup and thus preventing plants from hanging on the top of the transporter cup.

As illustrated in FIG. 6, ejector 61, comprising kick plate 64 and chute 62, pivots around axle 124. Plants are discharged from cup 46 as roller 80 passes through detent 61 and they fall through the funnel portion of chute 62 to lower portion 126 of ejector 61, which is positioned in shoe assembly 68. As the plant falls through chute 62, kick plate 64 moves to the discharge position illustrated in phantom lines in FIG. 6 whereby the plants are moved into appropriate planting position for packing by packing wheels 54 and 56 (FIG. 1). Because the chute and kick plate move together, jamming of plants is avoided. Also, the distance from the bottom of cups 46-51 can is significantly reduced. Both of these features increase the planting efficiency is increased by decreasing manual replanting of incorrectly planted seedlings.

The polymer furrow opening shoe 68 is further illustrated in FIG. 7 and includes a spade 128 located on the front of the furrow opening shoe assembly. A front polymeric outer surface 130 is provided behind spade 128 in addition to the polymer surfaces 76 and 78 (FIG. 2). As illustrated in FIGS. 2 and 7, channel iron piece 70 extends from the front to the back of the furrow opening shoe. As further illustrated in FIG. 6, a polymer material layer 130 is positioned in front of a metal piece 132. The metal piece provides strength for the polymeric material so that it is not damaged during furrowing. The polymer layer is preferably ultra high molecular weight plastic.

The furrow opening shoe 68 is illustrated in a box-like form including channel iron bottom 70 having lips, or shoulder, 70a and 70b behind which the polymer material 76 and 78 are secured, and having washer and bolts 134 and 136, or other fastening means, at the top of the shoe, whereby said polymer layer is secured to the metal shoe. However, any type of shoe may be advantageously modified to include a polymeric layer and a projection to prevent debris from harming the polymeric layer during furrowing. Furthermore, although polymeric surface furrow opening shoes are known, they do not include such projection and consequently the polymer surface is easily damaged on such prior shoes.

Figure 8:
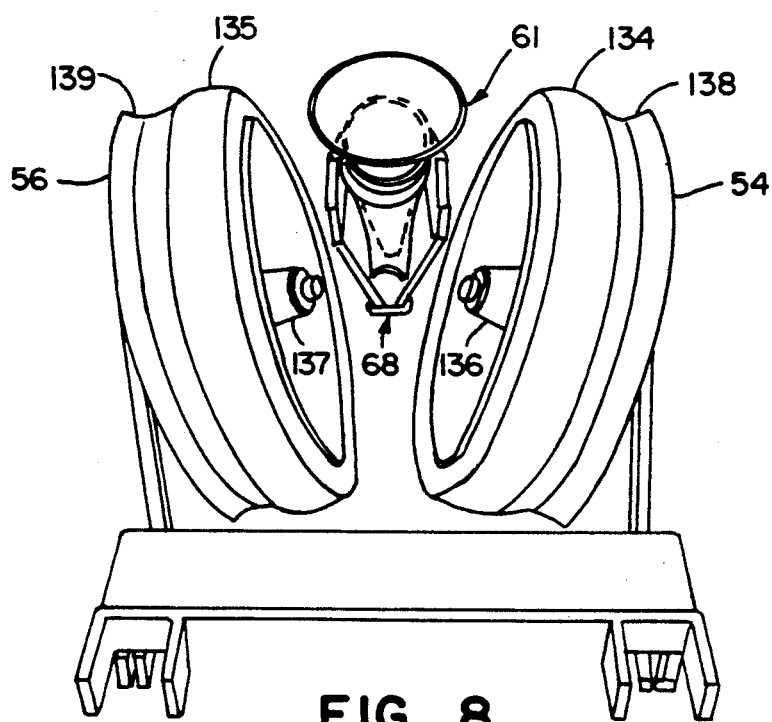
FIG. 8 is a perspective view of the packing wheels and the furrow opening shoe according to the invention.

Packing wheels 54 and 56 are further illustrated in FIG. 8. Packing wheels 54 and 56 are positioned behind furrow opening shoe assembly 68 and include zero pressure outer tires 134 and 135 and wheels 136 (FIG. 1) and 137, respectively. The zero pressure tires are conventional, well known zero pressure tires having zero pressure openings for permitting the escape of air. Packing wheels 54 and 56 are preferably angled toward one another at the back, and thus are wider near the furrow opening shoe assembly 68 than they are at the back. The angle of the wheels assists the packing wheels in packing soil around the plants as they are discharged from the furrow opening shoe by ejector 61. The packing wheels also include flares 138 and 139, respectively, which direct soil toward the inside of the wheels and thus toward the point where the plants exit shoe 68. Outer tires 134 and 135 are preferably made from synthetic rubber and include openings (not shown) to maintain zero pressure therein. By providing zero pressure tires 134 and 135 having flares 138 and 139, packing wheels 54 and 56 are flat where they engage the ground and effectively roll soil around the plants and eliminate air pockets around the roots.

Front wheel drive assembly 26 (FIG. 1) includes drive wheel 33 keyed to rotate axle 34 and sprocket 35, which in turn is connected to drive sprocket 40 via chain 42. Sprocket 40 is coupled to sprocket 142 (FIG. 9) by axle 140 whereby sprockets 40 and 142 rotate together. Sprocket 142 is in turn coupled to sprocket 144 by chain 146. Sprocket 144 is keyed to shaft 148, which is coupled through 90° translation box 150, whereby shaft 58, projecting through cam 60, and seventy-two teeth gear 152, rotate at substantially the same speed. The 90° translation box or gear reducer 150 may contain a beveled gear or differential therein, whereby shaft 58 and 72-teeth gear 152 will rotate at substantially the same rate. A 12-teeth gear 154 is keyed to rotate at six times the rate of 72-teeth gear 152, whereby ejector 61 ejects plants into the furrow created by shoe assembly 68 (FIG. 2) each time a plant is discharged from cups 46-51. The rate at which shaft 58 and 72-teeth gear 152 rotate is set by the rate at which transplanter 18 is pulled and the size of sprockets 35, 40, 142, and 144. Thus by changing the size of the sprockets, the speed with which the cup assembly 52 rotates may be adjusted.

As seen in FIG. 10, 72-teeth gear 152 is connected to a 12-teeth gear 154 whereby shaft 156 rotates at a rate six times faster than the 72-teeth gear. Shaft 156 and gear 154 are connected to rotate plate 158 with roller 160 displayed thereon. As roller 160 rotates eccentrically with shaft 156, D-shaped member 162 is displaced such that D-shaped member 162, bracket 164, and plate 166 all rotate around shaft 168. Shaft 168 is in turn keyed to kick plate 64, as illustrated in FIG. 6, whereby kick plate 64 and chute 62 will be pivoted between the vertical and eject positions six times during each rotation of 72-teeth gear 152. If ejector 61 (FIG. 2) is out of position such that half circle portion 163 of D-shaped member 162 is pulled against roller 160, roller 160 will push the half circle 163 whereby ejector 61 will be returned to a normal operating position.

OPERATION

In operation, as transplanter 18 is pulled by a tractor or other means, front wheel 33 rotates axle 34 and socket 35, which in turn rotate chain 42, sprocket 40, sprocket 142, chain 144, and sprocket 146. Rotation of sprocket 144 causes shaft 148 to rotate which, in turn, controls shafts 58 and 72-teeth gear 152 to rotate. Shaft 58 is keyed to cup assembly 52, cup assembly 52 rotating in either a clockwise or a counterclockwise direction, as desired, and set by translation box 150, for receiving plants in cups 46-51. As rollers 80-85 come into contact with detent 61 of cam 60, respective cups 46-51 open to discharge plants held therein. Cups 46-51 have flared tops so that large leafed plants may be received therein without being damaged.

Referring to FIG. 3, as cup assembly 46 rotates counterclockwise, as illustrated by arrow A, shell half 46b moves counterclockwise, as illustrated by arrow B, and cup half 46a moves clockwise, as illustrated by arrow C. The cup halves will open at a rate substantially equal to the rotational rate of the cup assembly 52, and thus shell half 46a will remain over chute 62, while the plant is being discharged and the opening between the cup halves will remain positioned over chute 62. Chute 62 (FIG. 2) includes a flared top which receives plants from cup assembly 52 and does not damage the plants as they pass therethrough. Additionally, kick plate 64 and chute 62 move together to position plants outside of the furrow opening shoe assembly 68. Because chute 62 and kick plate 64 of ejector 61 move together, they will not jam, which significantly reduces the stop and start time required for replacing plants when the mechanical planter jams. As indicated above, kick plate 64 ejects plants six times for every rotation of cup assembly 52 because of 72-teeth gear 152 and 12-teeth gear 154. Thus, as each cup 46-51 drops a plant through chute 62, the kick plate 64 will move from a vertical position to the discharge position (illustrated in phantom in FIG. 6). After the plant is discharged from shoe assembly 68, packing wheels 54 and 56 will pack down soil around the plants. Because packing wheels 54 and 56 are zero pressure tires having flared outer portions for pushing soil from the outside to the inside of the respective wheels, the tire provide excellent packing. The zero pressure tire advantageously provides flat contact with the ground for improved packing without leaving air pockets around roots.

It can thus be seen that a more versatile transplanter is disclosed which provides improved operation for transplanting large and small plants alike. It will become apparent to those skilled in the art that various modifications to the preferred embodiments described and disclosed herein can be made, which modifications will, however, fall within the spirit or scope of the invention as defined by the appended claims.

The embodiments of the invention in which an exclusive property or privilege is claimed are defined as follows.

1. A plant transplanter for mechanically planting seedlings comprising:

a furrow opening shoe for forming a furrow;

a cup assembly comprising a plurality of cups for receiving, holding and dispensing seedlings, said cups sequentially dispensing seedlings to be planted in said furrow;

each of said cups including first and second cup halves pivoted around a generally vertical axis to open and close, said cups pivoting laterally and horizontally away from one another to open and pivot laterally and horizontally toward one another to close; whereby said cup halves of each of said cups form a cup including a bottom to support the roots of said seedlings and sides to receive and hold a seedling when closed and said cup halves are spaced to dispense seedlings when open;

an ejector having a kick plate and a chute which move together in timed sequence with the dispensing of seedlings from said cup assembly to eject seedlings dispensed by and received from said cup assembly into said furrow formed by said furrow opening shoe;

said chute of said ejector includes a top portion providing a funnel for receiving the seedlings, said chute having a cut-a-way portion extending downwardly from said top portion and into said shoe and merging with said kick plate; and said chute and kick plate being movable in and out of said shoe in substantially the same timed sequence as the timed sequence of the dispensing of the seedlings by said cup assembly.

2. The plant transplanter as defined in claim 1, wherein said first cup half of each said cup includes a roller which is positioned against a cam for rotation around said cam as said cup assembly rotates, said cam including a detent which receives said rollers whereby a respective cup is opened when a respective roller is received in said detent.

3. The plant transplanter as defined in claim 2, further including a spring coupled to said second cup half of each cup to bias said roller on said first cup half against said cam.

4. The plant transplanter as defined in claim 3, further including a pair of gears for each cup of said cup assembly, said gears including teeth, each said cup half coupled to a respective gear, and the teeth of the gears coupled to the respective halves of each cup engaging one another, whereby said cup halves of each said cup pivot at the same rate.

5. The plant transplanter as defined in claim 4, wherein said cup halves pivot at substantially the same rate as said cup assembly when the cups open to discharge a plant, and wherein one cup half of each of said cups moves the same direction as the cup assembly when the respective cup opens, and the other cup half of each of said cups moves in the opposite direction of said cup assembly when the respective cup is opened, whereby said other cup half of each of said cups remains in substantially the same position as said respective cup opens whereby a plant in said respective cup is discharged into said ejector when said respective cup opens.

6. The plant transplanter as defined in claim 1 wherein said chute is attached to said kick plate by a fastener and said chute includes no moving parts.

7. The plant transplanter of claim 1 for mechanically planting seedlings comprising:
each of said cups for receiving, holding and dispensing a seedling to be planted in said furrow includes an element for engaging an outer perimeter of a cam while receiving, holding and dispensing said seedling, said cam including a recess in the perimeter thereof, and said cups dispensing said seedling held in said cups when said element engages said recess in said cam.

8. A plant transplanter for mechanically planting seedlings comprising:
a furrow opening shoe for forming a furrow;
a cup assembly comprising a plurality of cups for receiving, holding and sequentially dispensing seedlings in timed sequence to be planted in said furrow;
each of said cups including first and second cup halves pivoted around a generally vertical axis to open and close, said cups pivoting laterally and horizontally away from one another to open and pivot laterally and horizontally toward one another to close; whereby said cup halves of each of said cups form a cup including a bottom to support the roots of said seedlings and sides to receive and hold a seedling when closed and said cup halves are spaced to dispense seedlings when open;
an ejector having a kick plate and a chute which move together in timed sequence with the dispensing of seedlings from said cup assembly to eject plant seedlings dispensed by and received from said cup assembly into said furrow formed by said furrow opening shoe, said ejector pivotally mounted;
said chute of said ejector includes a top portion providing a funnel for receiving the seedlings, said chute having a cut-a-way portion extending downwardly from said top portion and into said shoe and merging with said kick plate;
said chute and kick plate being movable in and out of said shoe in substantially the same timed sequence as the timed sequence of the dispensing of the seedlings by said cup assembly; and
cam means, said cam means operatively connected to said ejector for causing said ejector to be pivoted in and out of said shoe.

9. A plant transplanter for mechanically planting seedlings comprising:
a furrow opening shoe for forming a furrow;
a cup assembly comprising a plurality of cups for receiving, holding and dispensing seedlings, said cups sequentially dispensing seedings to be planted in said furrow;
an ejector having a kick plate and a chute which move together in timed sequence with the dispensing of seedlings from said cup assembly to eject seedlings dispensed by and received from said cup assembly into said furrow formed by said furrow opening shoe;
said chute of said ejector includes a top portion providing a funnel for receiving the seedling, said chute having a cut-a-way portion extending downwardly from said top portion and into said shoe and merging with said kick plate;
said chute and kick plate being movable in and out of said shoe in substantially the same timed sequence as the timed sequence of the dispensing of the seedlings by said cup assembly; and
said furrow opening shoe including a polymer outer layer which does not accumulate dirt thereon, said polymer outer layer carried by said shoe and including an outer surface, said furrow opening shoe further including a protecting shoulder adjacent said polymer outer layer which projects at least to the outer surface of said polymer layer along a bottom of the shoe whereby said projecting shoulder prevents soil or debris from separating the outer layer form the shoe during furrowing.

10. The plant transplanter as defined in claim 9, wherein said furrow opening shoe includes a bottom having slots therein for receiving said polymer outer layer, said slots formed between a metal structure of said shoe over which said polymer layers are positioned, and outer lips of said bottom.

11. The plant transplanter as defined in claim 10, wherein said polymer outer layer consists of high molecular weight plastic, and said bottom comprises a channel iron.

12. A plant transplanter for mechanically planting seedlings comprising:
a furrow opening shoe for forming a furrow;
a cup assembly comprising a plurality of cups for receiving, holding and dispensing seedlings, said cups sequentially dispensing seedings to be planted in said furrow;
an ejector having a kick plate and a chute which move together in timed sequence with the dispensing of seedlings from said cup assembly to eject seedlings dispensed by and received from said cup assembly into said furrow formed by said furrow opening shoe;
said chute of said ejector includes a top portion providing a funnel for receiving the seedlings, said chute having a cut-a-way portion extending downwardly from said top portion and into said shoe and merging with said kick plate;
said chute and kick plate being movable in and out of said shoe in substantially the same timed sequence as the timed sequence of the dispensing of the seedlings by said cup assembly; and
wheels positioned behind and on each side of the furrow opening shoe for packing soil around seedlings placed in said furrow by said ejector, said wheels having zero pressure openings in a rubberlike outer surface for permitting the escape of air from inside the tire and a flared outside edge in said rubber-like outer layer whereby said wheels push soil toward said furrow.

13. A plant transplanter for mechanically planting seedlings comprising:
- a furrow opening shoe for forming a furrow;
- a cup assembly comprising a plurality of cups for receiving, holding and sequentially dispensing seedlings in a timed sequence to be planted in said furrow wherein each of said cups is defined by two respective cup halves, and wherein said cup halves of each cup pivot around a substantially vertical axis to open and close, said cup halves pivoting laterally and horizontally away from one another to open and pivoting laterally and horizontally toward one another to close;
- an ejector having a kick plate and a chute which move together in timed sequence to eject seedlings dispensed by and received from said cup assembly into said furrow formed by said furrow opening shoe;
- said chute of said ejector includes a top portion providing a funnel for receiving the seedlings, said chute having a cut-a-way portion extending downwardly from said top portion and into said shoe and merging with said kick plate; and
- said chute and kick plate being movable in and out of said shoe in substantially the same timed sequence with as the timed sequence of the dispensing of the seedlings by said cup assembly.

14. The plant transplanter as defined in claim 13, wherein a first cup half of each said cup includes a roller which is positioned against a cam for rotation around said cam as said cup assembly rotates, said cam including a portion which causes a respective roller at a rotational position thereof to open a respective cup.

15. A cup assembly for a mechanical plant transplanter for planting seedlings, said assembly including a plurality of cups which rotate for receiving and holding seedlings to be discharged for planting in a furrow, each of said cups comprising a first and second cup half; and
- wherein said first and second cup halves of each cup pivot around a generally vertical axis to open and close, said cups pivoting laterally and horizontally away from one another to open and pivot laterally and horizontally toward one another to close; whereby said cup halves of each of said cups form a cup including a bottom to support the roots of said seedlings and sides to receive and hold a seedling when closed and said cup halves are spaced to dispense seedlings when open.

16. A cup assembly for a mechanical plant transplanter for planting seedlings, said assembly including a plurality of cups which rotate for receiving and holding seedlings to be discharged for planting in a furrow, each of said cups comprising a first and second cup half;
- wherein said first and second cup halves of each cup pivot around a generally vertical axis to open and close, said cups pivoting laterally and horizontally away from one another to open and pivot laterally and horizontally toward one another to close; and
- wherein said assembly includes a cam and said first cup half of each said cup includes a roller which is positioned against said cam of said transplanter for rotation around said cam as said cup assembly rotates, wherein said cam includes a portion which causes a respective roller to open a respective cup of said assembly.

17. A cup assembly for a mechanical plant transplanter for planting seedlings, said assembly including a plurality of cups which rotate for receiving and holding seedlings to be discharged for planting in a furrow, each of said cups comprising a first and second cup half;
- wherein said first and second cup halves of each cup pivot around a generally vertical axis to open and close, said cups pivoting laterally and horizontally away from one another to open and pivot laterally and horizontally toward one another to close; and
- wherein said assembly includes a cam and said first cup half of each said cup includes a roller which is positioned against said cam of said transplanter for rotation around said cam as said cup assembly rotates, wherein said cam includes a detent which receives a respective roller for opening a respective cup of said assembly.

18. The cup assembly as defined in claim 17, further including a spring coupled to said second cup half of each cup to bias said roller on said first cup half against said cam.

19. The cup assembly as defined in claim 18, further including a pair of gears for each cup of said cup assembly, said gears including teeth, each said cup half coupled to a respective gear of a respective pair of gears, and the teeth of each pair of gears interlocked, whereby said cup halves of each said cup pivot at the same rate.

20. The plant transplanter as defined in claim 19, wherein said cup halves pivot at substantially the same rate as said cup assembly when the cups open to discharge a seedling, and wherein one cup half of each of said cups moves in the same direction as the cup assembly when the respective cup opens, and the other cup half of each of said cups moves in the opposite direction of said cup assembly when the respective cup is opened, whereby said other of the cup half of each of said cups remains in substantially the same position as said respective cup opens whereby a plant in said respective cup is discharged into said ejector when said respective cup opens.

21. A plant transplanter for mechanically planting seedlings comprising:
- a furrow opening shoe for forming a furrow;
- means for receiving, holding and dispensing seedlings to be planted in said furrow, said means including at least one cup rotating around a first axis, said at least one cup including two cup sections which form said cup when said cup sections are in a closed position, said cup sections pivoting around a second axis to move between an open position and said closed position, said second axis being substantially parallel to said first axis; and
- an ejector having a kick plate and a chute which move together to eject plants dispensed by and received from said means into said furrow formed by said furrow opening shoe.

22. The plant transplanter of claim 21 in which the said chute of said ejector includes a top portion providing a funnel for receiving the seedlings, said chute having a cut-a-way portion extending downwardly from said top portion and into said shoe and merging with said kick plate;
- said chute and kick plate being movable in and out of said shoe in timed sequence with the dispensing of the seedlings by said cup assembly.

23. The plant transplanter of claim 22 in which the ejector is pivotally mounted; and
- cam means operatively connected to said ejector for causing said ejector to be pivoted in and out of said shoe.

* * * * *